Inventor
Leo C. Shippy

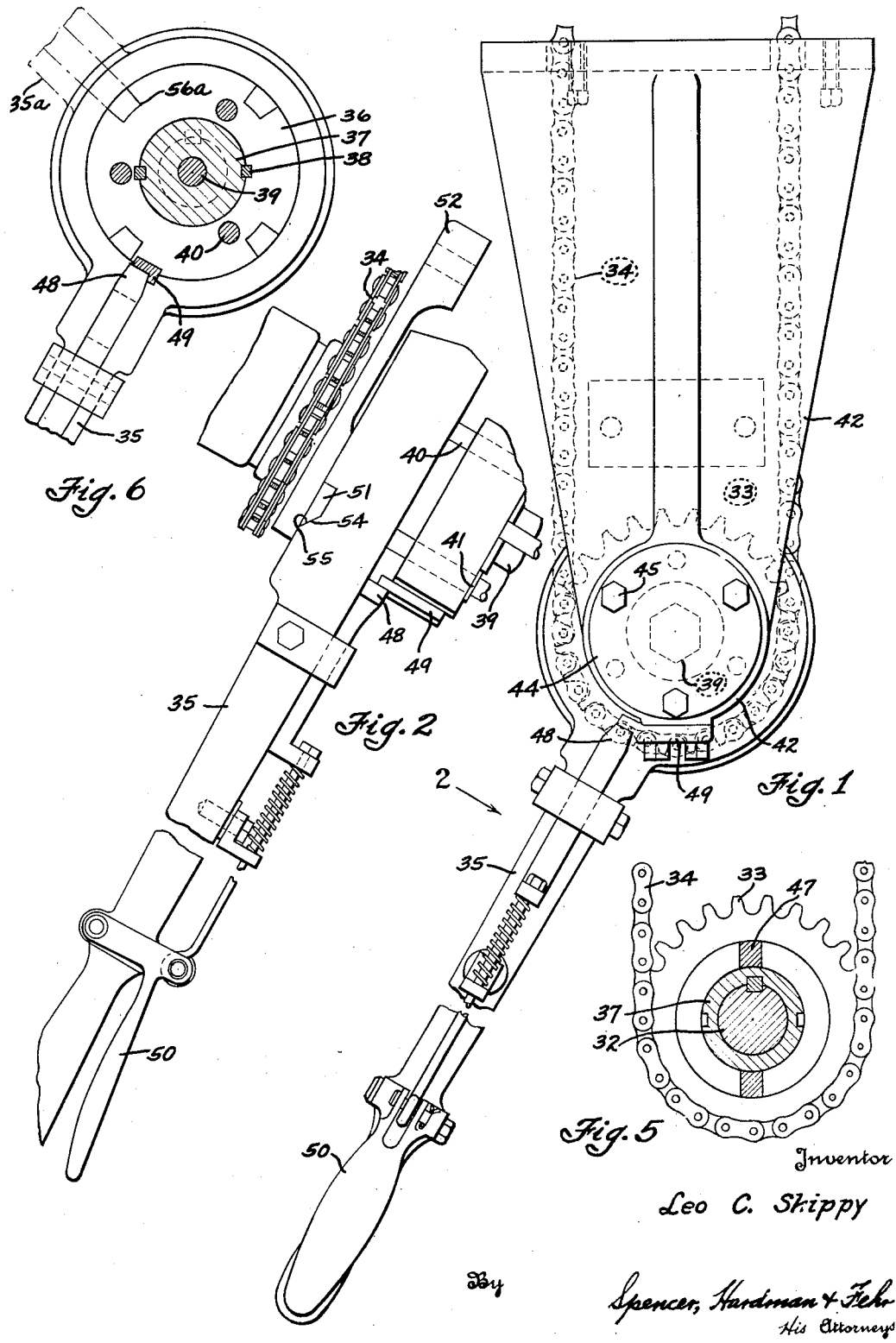

Patented Dec. 26, 1933

1,941,325

UNITED STATES PATENT OFFICE 1,941,325

VALVE CONTROL

Leo C. Shippy, Anderson, Ind., assignor to Delco-Remy Corporation, Anderson, Ind., a corporation of Delaware Original application April 3, 1929, Serial No. 352,310. Divided and this application February 9, 1931. Serial No. 514,614

8 Claims. (Cl. 137—139)

This application is a division of my application Serial Number 352,310, filed April 3, 1929, now Patent No. 1,820,252, and relates to a device for controlling the pressure applied to a hydraulic press, and in particular to a device for controlling the pressure by a mechanical or manually operated mechanism.

An object of the present invention is to provide a means to operate a rotary valve which, when rotated through a predetermined angle automatically connects the cylinder of a hydraulic press to a pressure different from the pressure applied immediately before the rotation of the valve.

Further objects and advantages of the present invention will be apparent from the following description, reference being had to the accompanying drawings wherein a preferred embodiment of one form of the present invention is clearly shown.

In the drawings:

Fig. 1 is a plan view of the valve driving mechanism.

Fig. 2 is a side view of the valve driving mechanism looking in the direction of the arrow 2 in Fig. 1.

Fig. 5 is a sectional view taken on the line 5—5 of Fig. 3.

Fig. 6 is a sectional view taken on the line 5—5 of Fig. 3.

Figure 3:
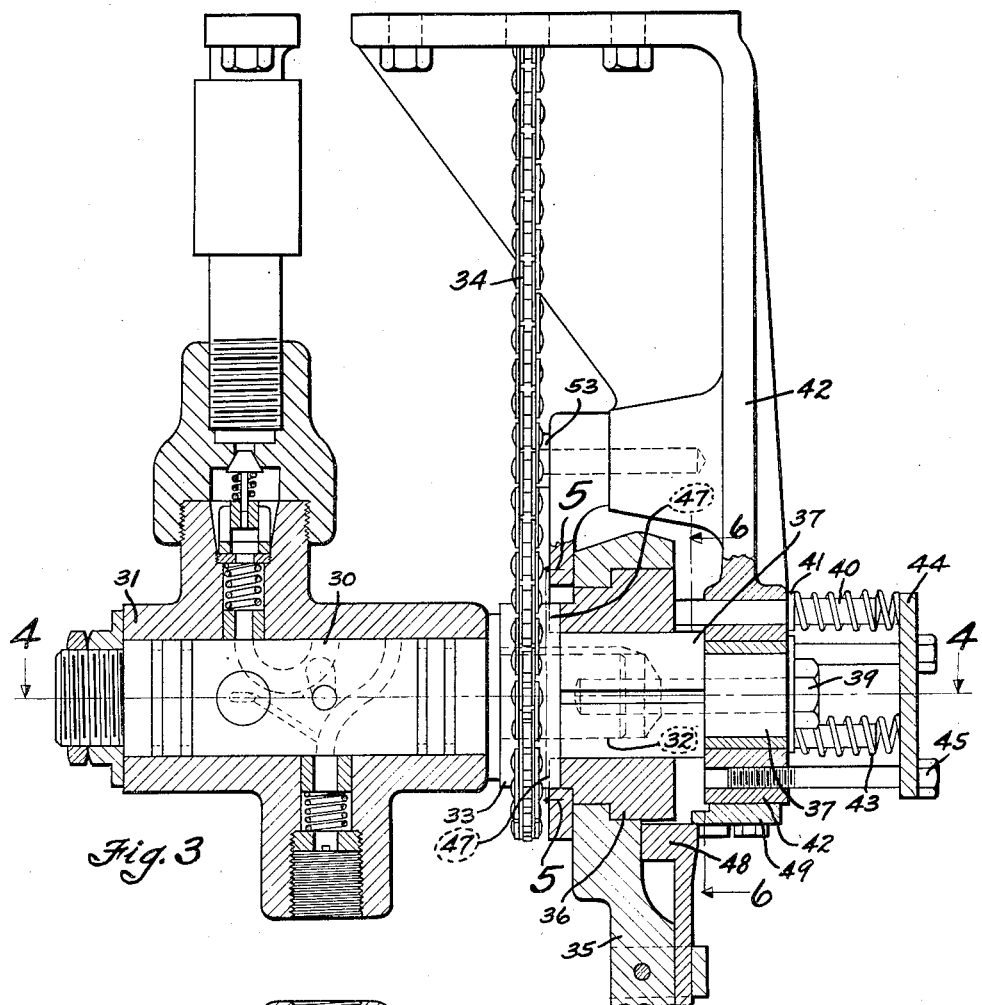
Fig. 3 is a sectional view of the valve mechanism taken substantially on the line 3—3 of Fig. 4.

In the drawings, the reference character 30 indicates a rotary valve cooperating with a valve seat member 31 in order to control the pressure applied to the cylinder of a hydraulic press. The valve 30 may have four operating positions requiring it to be turned intermittently one quarter turn. The valve upon being rotated each quarter turn from the normal position connects the cylinder in sequence first to a source of low pressure, second to a source of high pressure, third to neutral position and fourth to the exhaust. To accomplish this, the valve 30 is mounted on an operating shaft 32 carrying a sprocket wheel 33 connected by a sprocket chain 34 with a sprocket wheel (not shown) and driven by mechanism described in the copending application mentioned heretofore.

Figure 4:
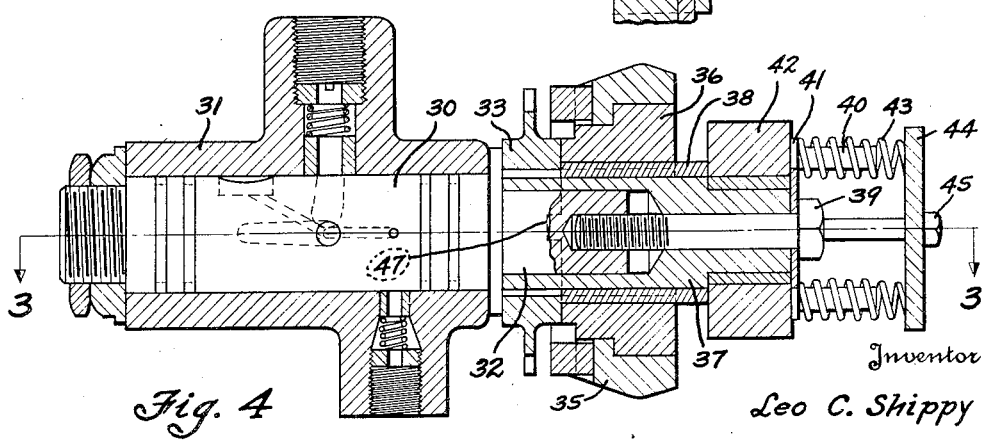
Fig. 4 is another sectional view of the valve mechanism taken on the line 4—4 of Fig. 3.

When it is desired to use the molding press for special work, the press may be operated manually. This is accomplished by the operator using a lever 35 to operate the valve 30. The lever 35 is mounted on a collar 36 splined to a member 37 by keys 38. Member 37 is provided with a recess which fits over the end of the shaft 32 and held there by a screw 39 threadedly engaging the end of the shaft. The collar 36 and the lever 35 may move axially along the member 37. Normally the members 35 and 36 are biased to the left as viewed in Fig. 3 by a plurality of pins 40 each of which is provided with a collar 41 normally abutting a frame 42 which rotatively supports the member 37. The pins 40 are biased to the left as viewed in Figs. 3 and 4 by helical springs 43 mounted intermediate the collar 41 and a plate 44 held in position by a plurality of screws 45 engaging the frame 42. Whenever the collar 36 is biased to the left as viewed in Figs. 3 and 4, a plurality of detents 47 as seen in Fig. 5 engage recesses provided therefor on the sprocket wheel 33. Consequently the collar 36 will be rotated by the sprocket wheel 33 when in this position.

The lever 35 is normally held in an inoperative position by a dog or pawl 48 resting on a member 49 attached to member 42 by suitable screws. Whenever the operator desires to use the machine he releases the dog 48 from a stop 49 by a conventional lever release 50. Now as the operator manually rotates the lever 35 in a clockwise direction as seen in Fig. 1 the lever 35 will be cammingly engaged by a detent or cam lug 51 integral with a member 52 attached to the frame 42 by suitable screws 53. The lever 35 will be biased to the right as viewed in Figs. 2, 3 and 4 by an inclined surface 54 of the cam lug 51 cooperating with an inclined surface 55 on a notch provided on the lever 35 for receiving the cam lug. As the lever 35 is rotated the dog 48 will engage a peripheral notch 56a in the collar 36. As the lever 35 is moved to the right by the detent 51, collar 36 will also be moved to the right so as to allow the detents 47 integral with the collar 36 to clear the recesses provided therefor in the sprocket 33. As the handle 35 is moved manually in a contra-clockwise rotation, as viewed in Fig. 6, the collar 36 and consequently the valve 30 will be rotated at the will of the operator without rotating the sprocket 33. As clearly seen in Fig. 6 if the lever is raised to the dot dash position 35a with the dog 48 released and then the dog 48 permitted to engage the notch 56a, it will rotate the valve 30 through a quarter turn when the lever is moved from 35a down to substantially position 35 where dog 48 abuts the stop 49. This provides a means whereby the operator can rotate the valve 30 through an angle of 90° and no more. The operator raises the lever 35 to the up position and down four times in succession in order to rotate the valve 30 through one revolution. It appears from Figs. 2 and 6 that it takes slightly more rotation of lever 35 in clockwise direction as viewed in Fig. 6 to clear dog 48 from the stop 49 than it takes to move the inclined notch surface 55 of lever 35 over the inclined surface 54 of cam lug 51. Furthermore stop 49 is so located relative to cam lug 51 that in the position of lever 35 shown in Fig. 6 the dog is entirely engaged by the stop 49, and cam lug 51 projects into the notch in lever 35. It is therefore obvious that upon clockwise rotation of lever 35 as viewed in Fig. 6, said lever 35 and the driven collar 36 will be first biased out of driving engagement with sprocket wheel 33 before the dog 38 clears stop 49. It also follows that during manual rotation of the valve 30 by lever 35, the latter will be stopped by a surface of stop 49 and thus prevented from rotating into a position in which the notch in the lever would align with the cam lug 51 while dog 48 is in driving engagement with collar 36.

While the form of embodiment of the present invention as herein disclosed, constitutes a preferred form, it is to be understood that other forms might be adopted, all coming within the scope of the claims which follow.

What is claimed is as follows:

1. A device for controlling the pressures applied to the cylinder of an hydraulic press comprising, in combination, a valve mechanism for connecting the cylinder to each of said pressures in a predetermined sequence; driving means for actuating said valve mechanism to change the pressure applied to the cylinder, said driving means including a clutch having a driving clutch part and a normally engaged driven clutch part, said driven clutch part being in permanent driving connection with the valve mechanism; a manually rotatable lever, said lever being normally out of driving engagement with the driven clutch part; means actuated in response to manual rotation of the lever in one direction for disengaging the driven clutch part from the driving clutch part; and means also actuated in response to continued manual rotation of the lever in said one direction for drivingly connecting the disengaged driven clutch part with said lever.

2. A device for controlling the pressures applied to the cylinder of an hydraulic press comprising, in combination, a valve mechanism for connecting the cylinder to each of said pressures in a predetermined sequence; driving means for actuating said valve mechanism to change the pressure applied to the cylinder, said driving means including a clutch having a driving clutch part and a normally engaged driven clutch part, said driven clutch part being in permanent driving connection with the valve mechanism; a manually rotatable lever; means for drivingly connecting the lever with the driven clutch part; and means actuated in response to manual rotation of the lever in one direction for disengaging the driven clutch part from the driving clutch part and for preventing driving connection between the lever and the driven clutch part for rotation in said one direction unless the latter is disengaged from the driving clutch part.

3. A device for controlling the pressures applied to the cylinder of an hydraulic press comprising, in combination, a valve mechanism for connecting the cylinder to each of said pressures in a predetermined sequence; driving means for actuating said valve mechanism to change the pressure applied to the cylinder, said driving means including a clutch having a driving clutch part and a longitudinally shiftable driven clutch part normally engaging the driving clutch part, said driven clutch part being in permanent driving connection with the valve mechanism; a manually operable lever rotatably supported by the driven clutch part but longitudinally immovable thereof, said lever having a notch; means for drivingly connecting the lever with the driven clutch part; and a stationary cam lug normally projecting into the correspondingly formed notch of the lever for shifting the driven clutch part out of engagement with the driving clutch part upon manual rotation of the lever in one direction and for preventing driving connection between the lever and the driven clutch part for rotation in said one direction unless the latter is out of engagement with the driving clutch part.

4. A device for controlling the pressures applied to the cylinder of an hydraulic press comprising, in combination, a valve mechanism for connecting the cylinder to each of said pressures in a predetermined sequence; driving means for actuating said valve mechanism to change the pressure applied to the cylinder, said driving means including a clutch having a driving clutch part and a longitudinally shiftable driven clutch part normally yieldingly urged into engagement with the driving clutch part and having peripheral notches equaling in number the number of pressures applied to the cylinder, said driven clutch part being in permanent driving connection with the valve mechanism and requiring one complete revolution in a certain direction for actuating the valve mechanism so as to connect the cylinder to each pressure in the predetermined sequence; a manually operable lever rotatably supported by the driven clutch part but longitudinally immovable thereof, said lever having a surface transverse to the shifting direction of the driven clutch and a notch in said surface; a dog slidably carried by the lever and yieldingly urged into driving engagement with a peripheral notch of the driven clutch part; means carried by the lever for withdrawing the dog from engagement with a notch of the driven clutch part; a stationary cam lug normally projecting into the correspondingly formed notch in the lever surface and cooperating with both for shifting the driven clutch part out of engagement with the driving clutch part upon manual rotation of the lever in one direction and for maintaining the driven clutch part out of engagement with the driving clutch part until the notch in the lever surface aligns with the cam lug; and stationary means for preventing driving engagement between the dog and a peripheral notch of the driven clutch part when the cam lug projects into the corresponding notch in the lever surface.

5. A device for controlling the pressures applied to the cylinder of an hydraulic press comprising, in combination, a valve mechanism for connecting the cylinder to each of said pressures in a predetermined sequence; driving means for actuating said valve mechanism to change the pressure applied to the cylinder, said driving means including a clutch having a driving clutch part and a longitudinally shiftable driven clutch part normally yieldingly urged into engagement with the driving clutch part and having peripheral notches equaling in number the number of pressures applied to the cylinder, said driven clutch part being in permanent driving connection with the valve mechanism and requiring one complete revolution in a certain direction for actuating the valve mechanism so as to connect the cylinder to each pressure in the predetermined sequence; a manually operable lever rotatably supported by the driven clutch part but longitudinally immovable thereof, said lever having a surface transverse to the shifting direction of the driven clutch and a notch in said surface; a dog slidably carried by the lever and yieldingly urged into driving engagement with a peripheral notch of the driven clutch part; means carried by the lever for withdrawing the dog from engagement with a notch of the driven clutch part; a stationary cam lug normally projecting into the correspondingly formed notch in the lever surface and cooperating with both for shifting the driven clutch part out of engagement with the driving clutch part upon manual rotation of the lever in one direction and for maintaining the driven clutch part out of engagement with the driving clutch part until the notch in the lever surface aligns with the cam lug; and a stationary stop having a surface to be engaged by the dog on the manually rotated lever when driving the driven clutch part in said one direction thereby preventing the lever from moving into a position in which the notch in the lever surface would align with the cam lug.

6. A device for controlling the pressures applied to the cylinder of an hydraulic press comprising, in combination, a valve mechanism for connecting the cylinder to each of said pressures in a predetermined sequence; driving means for actuating said valve mechanism to change the pressure applied to the cylinder, said driving means including a clutch having a driving clutch part and a longitudinally shiftable driven clutch part normally yieldingly urged into engagement with the driving clutch part and having peripheral notches equaling in number the number of pressures applied to the cylinder, said driven clutch part being in permanent driving connection with the valve mechanism and requiring one complete revolution in a certain direction for actuating the valve mechanism so as to connect the cylinder to each pressure in the predetermined sequence; a manually operable lever rotatably supported by the driven clutch part but longitudinally immovable thereof, said lever having a surface transverse to the shifting direction of the driven clutch and a notch in said surface; a dog slidably carried by the lever and yieldingly urged into driving engagement with a peripheral notch of the driven clutch part; means carried by the lever for withdrawing the dog from engagement with a notch of the driven clutch part; a stationary cam lug normally projecting into the correspondingly formed notch in the lever surface and cooperating with both for shifting the driven clutch part out of engagement with the driving clutch part upon manual rotation of the lever in one direction and for maintaining the driven clutch part out of engagement with the driving clutch part until the notch in the lever surface aligns with the cam lug; and a stationary stop being so located with respect to the cam lug that a surface of said stop prevents the dog from entering a peripheral notch in the driven clutch part when the cam lug projects into the corresponding notch of the lever surface.

7. A device for controlling the pressures applied to the cylinder of an hydraulic press comprising, in combination, a valve mechanism for connecting the cylinder to each of said pressures in a predetermined sequence; driving means for actuating said valve mechanism to change the pressure applied to the cylinder, said driving means including a clutch having a driving clutch part and a longitudinally shiftable driven clutch part normally yieldingly urged into engagement with the driving clutch part and having peripheral notches equaling in number the number of pressures applied to the cylinder, said driven clutch part being in permanent driving connection with the valve mechanism and requiring one complete revolution in a certain direction for actuating the valve mechanism so as to connect the cylinder to each pressure in the predetermined sequence; a manually operable lever rotatably supported by the driven clutch part but longitudinally immovable thereof, said lever having a surface transverse to the shifting direction of the driven clutch and a notch in said surface; a dog slidably carried by the lever and yieldingly urged into driving engagement with a peripheral notch of the driven clutch part; means carried by the lever for withdrawing the dog from engagement with a notch of the driven clutch part; a stationary cam lug normally projecting into the correspondingly formed notch in the lever surface and cooperating with both for shifting the driven clutch part out of engagement with the driving clutch part upon manual rotation of the lever in one direction and for maintaining the driven clutch part out of engagement with the driving clutch part until the notch in the lever surface aligns with the cam lug; and a stationary stop being so located with respect to the cam lug that a surface of said stop engages the dog on the manually rotated lever while in driving engagement with the driven clutch part thereby indicating a proper intermittent manual rotation of the driven clutch part in said one direction whereby another pressure is properly applied to the cylinder, and for preventing the lever while driving the driven clutch part in said one direction from moving into a position in which the notch in the lever surface would align with the cam lug.

8. A device for controlling the pressures applied to the cylinder of an hydraulic press comprising, in combination, a valve mechanism for connecting the cylinder to each of said pressures in a predetermined sequence; driving means for actuating said valve mechanism to change the pressure applied to the cylinder, said driving means including a clutch having a driving clutch part and a longitudinally shiftable driven clutch part normally yieldingly urged into engagement with the driving clutch part, and having peripheral notches equaling in number the number of pressures applied to the cylinder, said driven clutch part being in permanent driving connection with the valve mechanism and requiring one complete revolution in a certain direction for actuating the valve mechanism so as to connect the cylinder to each pressure in the predetermined sequence; a manually operable lever rotatably supported by the driven clutch part but longitudinally immovable thereof, said lever having a surface transverse to the shifting direction of the driven clutch and a notch in said surface; a dog slidably carried by the lever and yieldingly urged into driving engagement with a peripheral notch of the driven clutch part; means carried by the lever for withdrawing the dog from engagement with a notch of the driven clutch part; a stationary cam lug normally projecting into the correspondingly formed notch in the lever surface and cooperating with both for shifting the driven clutch part out of engagement with the driving clutch part upon manual rotation of the lever in one direction and for maintaining the driven clutch part out of engagement with the driving clutch part until the notch in the lever surface aligns with the cam lug; and a stationary stop being so located with respect to the cam lug that a surface of said stop prevents the dog from drivingly engaging a peripheral notch in the driven clutch part when the cam lug projects into the corresponding notch of the driven clutch part, and another surface of said stop engages the dog on the manually rotated lever while in driving engagement with the driven clutch part thereby indicating a proper intermittent manual rotation of the driven clutch part in said one direction whereby another pressure is properly applied to the cylinder, and for preventing the lever while driving the driven clutch part in said one direction from moving into a position in which the notch in the lever surface would align with the cam lug.

LEO C. SHIPPY.